Reissued Mar. 30, 1943

Re. 22,296

UNITED STATES PATENT OFFICE 22,296

PROCESS FOR TREATMENT OF METALS

Robert W. Shoemaker, Anderson, Ind., assignor to Agnes J. Reeves Greer, Morgantown, W. Va.

No Drawing. Original No. 2,257,133, dated September 30, 1941, Serial No. 279,053, June 14, 1939. Application for reissue September 19, 1942, Serial No. 459,037

13 Claims. (Cl. 117—49)

The invention relates to the treatment of metal, particularly to the cleaning of metal articles as by pickling, and is more especially concerned with a process designed to more effectively neutralize the acid and clean the metal to prevent corrosion of the metal after the pickling operation and prior to the cold rolling or other processing thereof.

Corrosion is an oxidation process, favored by the presence of air and moisture, especially in the presence of hydrogen ions, which means free acid.

The problem, therefore, is to remove these substances from the surfaces of the metal and to prevent their gaining access thereto before the cold rolling or other processing of the metal is performed.

It is common practice in the pickling of metal articles to immerse them in an acid solution for a sufficient time to remove the products of oxidation from the surfaces of the metal and to then rinse the articles in cold water, followed by a hot water or alkaline rinse in an effort to remove the acid therefrom.

Even if the articles are to be immediately subjected to a further processing such as cold rolling, they are sometimes oiled to prevent them from rusting, but it often happens that the metal rusts in a short time even when treated in this manner.

It was commonly believed that this rust was caused by the exposure of the wet metal to the air before the surfaces thereof were oiled, and it is known that attempts have been made to prevent this condition by applying oil to the surface of the metal while it is still wet from the rinsing operation.

It has been found by experience, however, that the application of oil to the surface of the metal, particularly strip steel before the same is cold rolled, is objectionable as the oil produces a black scum upon the steel and the cold rolls through which the strips are passed, as well as upon the back-up rolls therefor.

It has also been found that metal treated in this manner frequently rusts regardless of the manner in which the oil is applied to the surface thereof, and this is believed to be due to the fact that the pickling acid is not entirely removed from the surfaces and pores of the metal since this free acid or hydrogen ions remaining upon the surface or in the pores of the metal will cause oxidation when the metal is exposed to air and moisture.

The instant invention is predicated upon the discovery that metal articles can be prevented from rusting after the pickling operation by virtually removing all traces of acid from the surfaces and pores of the metal and immediately treating the surfaces of the metal to prevent the oxygen of the air from gaining access thereto.

The improved method may be carried out in the three conventional tanks, the pickling operation being performed in the first tank, the neutralizing and cleansing operation in the second tank, and the coating for preventing oxidation is applied in the third tank.

Another important object of the invention is to eliminate the use of oil upon the surfaces of the pickled and cleaned metal so as to prevent the formation of a black scum upon the steel and the cold rolls through which the metal may be later passed; and to coat the surfaces of the metal with an ester or one or both of its resulting saponification products, which may be either a polyhydric alcohol such as glycerine, glycol, or a soluble ammonium soap such as ammonium oleate, ammonium linoleate or ammonium laurate.

A further object is to provide for thoroughly cleaning the surfaces and pores of the metal to virtually remove all traces of acid therefrom by means of caustic alkali and a wetting agent.

In treating coils of metal the invention has been carried out in a pickling machine such as disclosed in Greer Patent No. 2,091,921, wherein the coils are suspended upon mandrels and rotated as they are moved forward through the pickling and washing baths.

The coils are first passed through the acid tank which contains approximately 6% sulphuric acid in water at a temperature of between 160° and 185° F. together with a suitable inhibitor.

After the coils are pickled in the acid tank they are transferred to the first washing tank in which the water may be maintained at a temperature between 180° and 212° F.

Hot water is used in this tank instead of the usual cold water ordinarily used for the first rinse, as it is found that hot water more thoroughly cleanses the metal.

In order to completely remove all of the acid from the metal ordinary soap, caustic alkali, and a wetting agent are added to the hot water.

Only a relatively small quantity of each of these ingredients is necessary to give very satisfactory results. Ordinary soap powder or soap chips may be used in proportions ranging between .125% to .275%. In actual practice with a tank containing approximately 5600 gallons of water, 10 to 20 pounds of ordinary soap powder or soap chips gave very satisfactory results, the soap powder or soap chips used being sold under the name of Ozonite. Any ordinary soap powder or soap chips which are effective in alkaline solution may be used for the purpose.

The ordinary soap is used for the purpose of cleansing the metal, as well as lubricating the mandrel and coil when the process is carried out in a machine in which the coils are rotated upon mandrels as in the manner generally shown in the Greer patents; and as above pointed out, oil is not a suitable lubricant since it leaves a black scum upon the metal coils.

The caustic alkali used may be either caustic soda or a prepared neutralizing compound such as super alkali No. 4 which is a mixture of sodium carbonate and sodium hydroxide, and may be in an amount ranging from .275% to .550%.

From 50 to 150 pounds of caustic soda in this tank have given very satisfactory results and, if desired, super alkali No. 4 or other prepared neutralizing agent in proportions varying from 75 pounds to 225 pounds may be substituted for the caustic soda.

A small quantity of a wetting agent is added to the solution to cause the caustic alkali and soap to enter the pores of the metal neutralizing the acid therein. This wetting agent may be one of the so-called soapless soaps and is used in proportions ranging from .02% to .5%.

For this purpose from 10 to 20 pounds of Orvus W. A. paste which is a sodium salt of the sulphated alcohol obtained from cocoanut oil, may be added to the solution in the first washing tank. Wetting agents of this kind will not form any insoluble lime soaps when used with hard water and are effective in alkaline or acid media.

These wetting agents are used because of their high penetrating qualities very materially reducing the surface tension of the water so as to allow complete penetration of the pores of the metal by the alkali and soap.

If it is desired to prevent foaming of the solution in this tank, the wetting agent may be also a foam eliminating agent such as sodium metaphosphate or sodium hexametaphosphate. This may be obtained commercially under the name of Calgon and in use in this process 5 to 10 gallons of this agent placed in the first washing tank give very good results. Other commercial products such as Tergitol may be used for this purpose.

If it is found necessary or desirable to precipitate suspended or colloidal particles in this solution a small amount, approximately .002% to .006% of a suitable chemical may be used.

Good results have been obtained by using 1 to 3 pounds of a mixture of ground sulphate of aluminum, sodium carbonate and sodium bicarbonate, which mixture may be obtained commercially under the name of The Old Settler.

For the purpose of giving the steel a whiter color, small amounts of a bleaching agent have been used in some instances. Sodium hypochlorite may be used in quantities of .01% to .04%; 1 to 2 gallons of this bleaching agent in the first washing tank having given the metal a whiter color in actual use.

However, due to the fact that this bleaching agent is to some extent an oxidizing agent its use is not recommended where the steel is to be kept for any length of time before cold rolling or other processing, and since the bleaching agent is only used for giving a whiter color to the steel and is not otherwise necessary in the present process, it may be eliminated without affecting the process.

Although the best results are obtained by using hot water as above described in the first washing tank, it should be understood that even with the use of cold water the above solution is very effective in cleaning the pores and surfaces of the metal.

After the metal has been rinsed in the first washing tank it is transferred to the second washing tank which contains hot water, soap, caustic alkali, and a wetting agent and an ester, or one or both of its resulting saponification products, which may be either a polyhydric alcohol or an ammonium soap, for the purpose of forming an impervious film upon the surfaces of the metal.

Examples of esters which have produced a satisfactory coating upon the metal are diglycol laurate, diglycol oleate, glyceryl oleate and glyceryl monoricinoleate.

The water in this second washing tank may be maintained at a temperature of 140° to 212° F. This tank contained about 4800 gallons and a small amount of ordinary soap chips or soap powder, approximately .02% to .05%.

An amount ranging from 5 pounds to 15 pounds of Ozonite soap powder or chips in the second washing tank gave very satisfactory results.

Caustic alkali in amounts of from .01% to .05% were found sufficient in this tank and in actual practice amounts of caustic soda varying from 15 pounds to 30 pounds gave very satisfactory results.

The wetting agent used in this second tank may be any of the wetting agents above referred to as used in the first washing tank and may be in concentrations of from .1% to .5%. In actual practice 5 to 20 pounds of Orvus, as described above, has given very good results, and where a foam eliminating agent is desired, 5 to 10 gallons of metaphosphate or sodium hexametaphosphate may be substituted for the Orvus with very satisfactory results.

Caustic alkali in the proportion of .275% to .55% may be used in this second washing tank and in actual practice 15 to 30 pounds of caustic soda has given very satisfactory results.

If desired, a small amount of bleaching agent such as sodium hypochlorite, preferably about .025% to .05% may be added to the solution, although as above stated in reference to the first washing tank, this bleaching agent may be eliminated without affecting the process.

For the purpose of providing an impervious film upon the surfaces of the metal to prevent formation of rust after the metal is thoroughly cleaned, an ester, a polyhydric alcohol, or ammonium soap, the two latter being products of the saponification of the ester, may be added to the solution in the second washing tank, about .25% to .625% being sufficient for the purpose.

Glycerine or glycerol, and glycol commonly called ethylene glycol are examples of polyhydric alcohols which are suitable for this purpose, and ammonium soap of a fatty acid such as lauric acid, oleic acid or linoleic acid, namely, ammonium oleate, ammonium linoleate, and ammonium laurate are examples of soluble ammonium soaps which may be used to form the impervious film upon the metal. From 10 to 25 gallons of glycerine or glycerol in the second washing tank have been found to be very effective.

If desired, a soluble ammonium soap such as ammonium oleate, ammonium linoleate or ammonium laurate, may be used in the second washing tank together with an ester of a polyhydric alcohol such as glycerol or glycol and a fatty acid such as lauric, oleic or linoleic, in the form of diglycol laurate, diglycol oleate, and glyceryl oleate or glyceryl monoricinoleate.

When the articles are removed from the second washing tank, the hot water quickly evaporates from the surfaces of the articles leaving an impervious film of the ester, polyhydric alcohol or soluble ammonium soap thereon to protest the surfaces of the articles from oxidation, and since the surfaces and pores of the metal have been thoroughly cleansed of all of the pickling acid before this protecting film is applied thereto, the metal will remain entirely free from rust for a considerable length of time.

The ordinary soaps, wetting agents, esters, polyhydric alcohols or soluble ammonium soaps all act as lubricants for the metal coils and mandrels when the process is used in a pickling machine of the type of the Greer patent above referred to, thus overcoming any effect the caustic alkali might have upon the proper rotation of the mandrels and coils.

It has been found that the protective quality of the polyhydric alcohol is enhanced by the presence of hydroxyl ions furnished by the caustic alkali so that the glycerine or other polyhydric alcohols in combination with the alkali furnishes a better protective coat than either substance alone.

When the caustic alkali and polyhydric alcohol solution was used no black scum appeared on the rolls of the cold rolling mills or on the metal itself as is the case where soluble oil is used as a protective coating upon the metal.

While the improved process has been described as carried out in the conventional manner by means of a pickling tank and two rinsing tanks, it should be understood that it is not the intention to limit the invention to the use of two rinsing tanks, but, all of the ingredients may be contained in solution in one rinsing tank, or several rinsing tanks may be used each containing a solution of one or more of the above named ingredients, and the following claims should be read with this understanding.

I claim:

1. The method of treating pickled metal directly after the pickling thereof to neutralize the adhering acid and inhibit rusting of the metal comprising rinsing it in a solution containing caustic alkali, a polyhydric alcohol taken from a group consisting of glycerine and glycol, and a wetting agent taken from a group consisting of sodium metaphosphate and sodium hexametaphosphate.

2. The method of treating pickled metal directly after the pickling thereof to neutralize the adhering acid and inhibit rusting of the metal comprising rinsing it in a solution containing caustic alkal, glycerine, and a wetting agent taken from a group consisting of sodium metaphosphate and sodium hexametaphosphate.

3. The method of treating pickled metal directly after the pickling thereof to neutralize the adhering acid and inhibit rusting of the metal comprising rinsing it in a solution containing caustic alkal, a polyhydric alcohol taken from a group consisting of glycerine and glycol, ordinary soap, and a wetting agent taken from a group consisting of sodium metaphosphate and sodium hexametaphosphate.

4. The method of treating pickled metal comprising rinsing it in a solution containing caustic alkali, glycerine, ordinary soap, and a wetting agent taken from a group consisting of sodium metaphosphate and sodium hexametaphosphate.

5. The method of treating pickled metal directly after the pickling thereof to neutralize the adhering acid and inhibit rusting of the metal comprising rinsing it in a solution containing caustic alkali, ordinary soap, a precipitating agent consisting of a mixture of sulphate of aluminum, sodium carbonate and sodium bicarbonate, a bleaching agent and a wetting agent taken from a group consisting of sodium metaphosphate and sodium hexametaphosphate, and immersing the metal in a solution containing a polyhydric alcohol taken from a group consisting of glycerine and glycol.

6. The method of treating pickled metal directly after the pickling thereof to neutralize the adhering acid and inhibit rusting of the metal comprising rinsing it in a solution containing caustic alkali, ordinary soap, a precipitating agent consisting of a mixture of sulphate of aluminum, sodium carbonate and sodium bicarbonate, a bleaching agent and a wetting agent taken from a group consisting of sodium metaphosphate and sodium hexametaphosphate, and immersing the metal in a solution containing glycerine.

7. The method of treating pickled metal directly after the pickling thereof to neutralize the adhering acid and inhibit rusting of the metal comprising rinsing it in a solution containing caustic alkali, ordinary soap, a precipitating agent consisting of a mixture of sulphate of aluminum, sodium carbonate and sodium bicarbonate, a bleaching agent and a wetting agent taken from a group consisting of sodium metaphosphate and sodium hexametaphosphate, and immersing the metal in a solution containing glycol.

8. The method of treating pickled metal directly after the pickling thereof to neutralize the adhering acid and inhibit rusting of the metal comprising rinsing it in a solution containing caustic alkali and a wetting agent taken from the group consisting of sodium metaphosphate and sodium hexametaphosphate, and then coating the metal with a solution containing a polyhydric alcohol taken from a group consisting of glycerine and glycol.

9. The method of treating pickled metal directly after the pickling thereof to neutralize the adhering acid and inhibit rusting of the metal comprising rinsing it in a solution containing caustic alkali, ordinary soap, and a wetting agent taken from the group consisting of sodium metaphosphate and sodium hexametaphosphate, and then coating the metal with a solution containing a polyhydric alcohol taken from a group consisting of glycerine and glycol.

10. The method of treating pickled metal directly after the pickling thereof to neutralize the adhering acid and inhibit rusting of the metal comprising rinsing it in a solution containing caustic alkali and a wetting agent taken from the group consisting of sodium metaphosphate and sodium hexametaphosphate, and then coating the metal with a solution containing glycerine.

11. The method of treating pickled metal directly after the pickling thereof to neutralize the adhering acid and inhibit rusting of the metal comprising rinsing it in a solution containing caustic alkali, ordinary soap, and a wetting agent taken from the group consisting of sodium metaphosphate and sodium hexametaphosphate, and then coating the metal with a solution containing glycerine.

12. The method of treating pickled metal directly after the pickling theerof to neutralize the adhering acid and inhibit rusting of the metal comprising rinsing it in a solution containing caustic alkali and then submerging the metal into a solution containing caustic alkali and a polyhydric alcohol taken from a group consisting of glycerine and glycol.

13. The method of treating pickled metal directly after the pickling thereof to neutralize the adhering acid and inhibit rusting of the metal comprising rinsing it in a solution containing caustic alkali and then submerging the metal into a hot solution containing caustic alkali and a polyhydric alcohol taken from a group consisting of glycerine and glycol and then removing the hot metal from the hot solution and permitting the water to quickly evaporate from the surface thereof leaving an impervious film of the polyhydric alcohol thereon.

ROBERT W. SHOEMAKER.